United States Patent Office 3,337,773
Patented Aug. 22, 1967

3,337,773
OVERLOAD PREVENTION FOR CONTROL SYSTEMS
William F. McKenna and William A. Paulson, Rockford, Ill., assignors to Barber-Colman Company, Rockford, Ill., a corporation of Illinois
Filed Nov. 6, 1964, Ser. No. 409,479
27 Claims. (Cl. 317—33)

The present invention relates in general to control systems and in particular to the prevention of the transfer of the manipulated medium or energy from a source to a utilization device at excessive or "overload" rates.

In many types of control systems, the transfer of the manipulated medium, for example, electric current from a source to a utilization device, is governed or modulated by a final control element so as to vary the rate of transfer and thereby maintain a controlled variable or condition (e.g., temperature, pressure, speed or position) at a desired value. In such systems, the utilization device responds to the energy or manipulated medium supplied to it by changing the controlled variable. In closed loop systems, the value of the controlled variable is usually compared with a desired or set point value in order to create an error or first control signal which is amplified and converted into a second control signal supplied to the final control element so that the latter adjusts the transfer rate until the error is reduced substantially to zero.

As a specific example, consider a system for controlling the temperature (controlled variable) of an electric furnace having therein a resistance heating element (energy utilization device). A silicon controlled rectifier (the final control element) may be interposed between A.C. supply mains (that is, an electrical energy source) and the heating element to control the magnitude of current flow (that is, the manipulated variable or rate of energy transfer) to the latter according to a variable phase gate control signal derived from a comparison between the actual value of the furnace temperature and the desired or set point value of temperature. When the actual temperature rises or falls, the firing angle of the silicon controlled rectifier is increased or decreased, so the average current transferred by the silicon controlled rectifier to the heating element is decreased or increased until the error is reduced substantially to zero.

Over the last several years, there has been recognized the need to limit the rate of transfer of the manipulated medium under certain conditions of operation. Merely by way of explanation with further reference to the foregoing example, it may be noted that any electrical energy supply source is limited in the maximum current which it can safely deliver; exceeding a predetermined current value may possibly overheat or damage power transformers or alternators which make up the energy source. Similarly, silicon controlled rectifiers, as well as other types of final control elements, are limited in the rate at which they can transmit current without being damaged. The heating element in furnaces is also subject to damage by excessive currents, and the refractory materials of the furnace itself may be adversely affected if their temperature is increased too abruptly. Yet, when the furnace temperature is greatly below set point temperature, when a heating element with a high temperature coefficient of resistance is cold, or when magnetic core transformers or transducers in the system are first energized, then there is a tendency for the electric current to exceed permissible values, and thus possibly to damage the electric energy source, the final controlled rectifiers, or the furnace itself.

One of the most elementary and widely adopted overload prevention techniques involves the use of fuses or automatically tripped circuit breakers. These offer no real solution in the case of more recent and advanced control systems, however, since the conditions which tend to cause current overloads are encountered as a matter of normal operation, e.g., during the initial period when such a control system is first placed in operation. By the time a fuse blows or a circuit breaker trips, the damage may have already been done to final control elements such as silicon controlled rectifiers. Moreover, the interruption in operation while a fuse is replaced or a tripped circuit breaker reclosed is intolerable in the operation of modern control systems. It has been the objective of many proposals, therefore, to prevent overloads before they occur. Such proposals have involved very complex, expensive, and in many cases unreliable additions to the basic control apparatus.

It is the general aim of the present invention to provide a new and improved arrangement for preventing overloads in control systems and yet to accomplish this by very simple, relatively inexpensive, and highly reliable physical components.

An important object of this invention is to automatically prevent the very brief, but exceedingly great, excessive overloads which might otherwise occur at the instant that the control system is first put into operation.

In this connection, it is also an object to inhibit transfer of the manipulated medium to the utilization device when the system is first connected to an energy source until such time that the various active transducers, which require energy for their operational functions, have been excited so that they no longer permit excessive overloads to be drawn by the energy utilization device.

A related object is to prevent such overloads which would otherwise arise during start-up before any feedback signal could become effective in reducing the rate of energy transfer.

More specifically, it is an object of the invention to preclude electric current surges immediately after the main switch is closed to start up an A.C. powered control system, such surges tending to occur due to the fact that magnetic cores of transformers, transducers and the like may be substantially saturated by residual flux, or at least may be driven into saturation momentarily if the main switch closes at an unfavorable point in the A.C. source voltage cycle.

Another object of the invention is to provide an automatic limiter which is effective to limit the rate of transfer through a final control element to a given, permissible value and even though the potential overload would otherwise be on the order of fifteen times greater than the permissible rate.

It is a related object to provide an energy rate limiter which quickly depresses the rate of energy transfer when the latter tends to exceed a certain or safe level, and yet which restores the system gradually to its normal operation when the conditions tending to create the overload disappear.

More specifically, it is an object to provide a current limiter for use in an automatic electric control system and which obviates any need for an automatic circuit breaker, permitting safety devices such as fuses to be used only for protection in the case of very abnormal and rare conditions, such as short circuiting of the load.

Still another object is to bring about both initial start-up overload protection and overload prevention during subsequent operation through the use of a single and relatively simple integrator which contributes to both such protective functions.

Other objects and advantages will become apparent as the following description proceeds, taken in conjunction with the accompanying drawings, in which.

While the invention has been shown and will be described in some detail with reference to particular embodiments thereof, there is no intention that it thus be limited to such detail. On the contrary, it is intended here to cover all modifications, alternatives and equivalents falling within the spirit and scope of the invention as defined by the appended claims.

Figure 1:
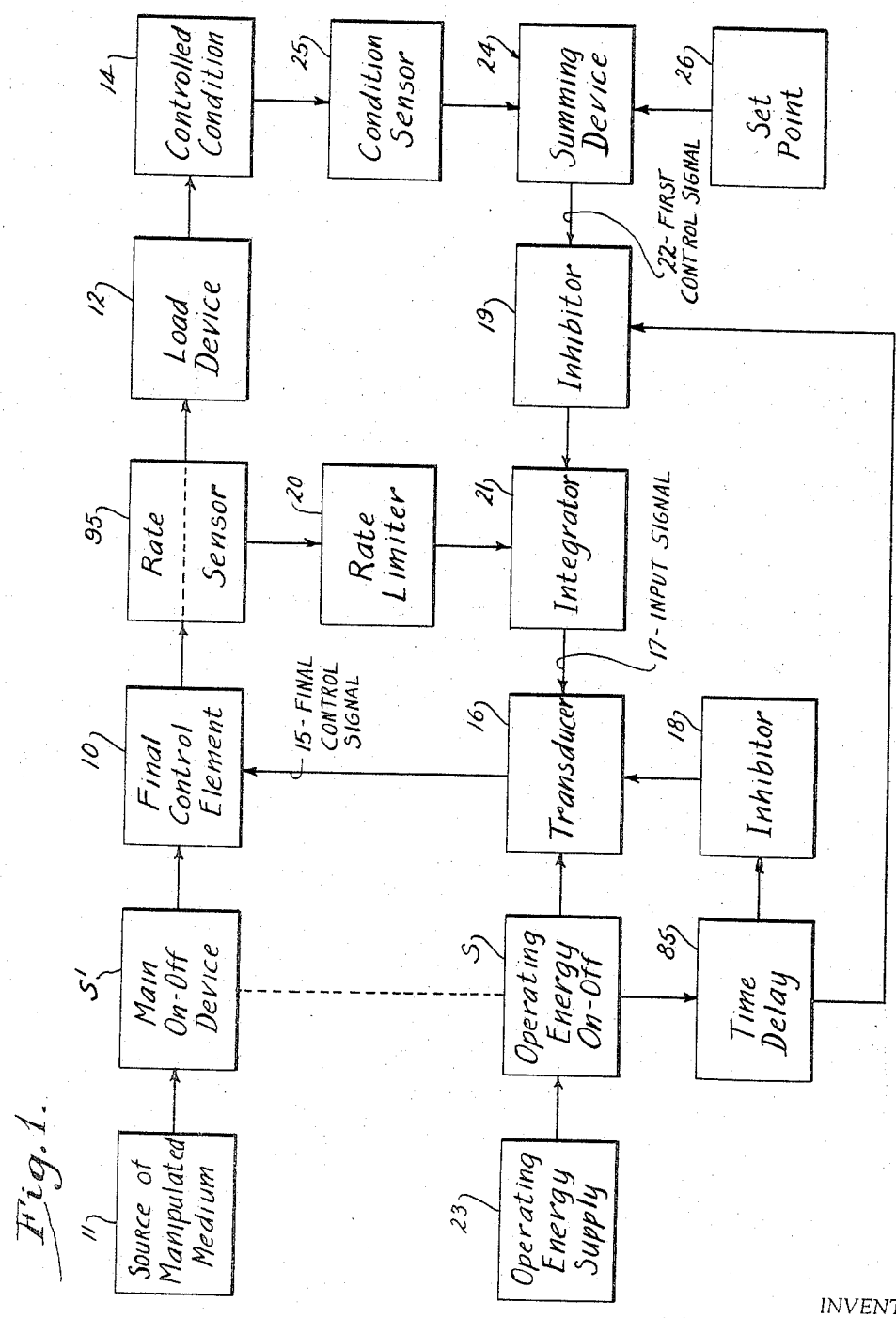
FIGURE 1 is a block and line diagram illustrating in terms of functional operation a typical control system embodying the overload prevention features of the present invention.

The control system embodying the present invention may best be understood in a general or functional sense by reference to FIG. 1, and it will be described in more specific but exemplary details with reference to the succeeding figures. Referring first to FIG. 1, a final control element 10 is interposed between a source 11 of the manipulated medium and a utilization load device 12 so as to modulate or vary the rate at which the manipulated medium is transferred to the load. The load device in turn utilizes the transferred medium to maintain or change a controlled condition 14 so that the latter is adjusted to a desired value. A main on-off device S' may be closed or opened to connect or disconnect the source 11 to or from the system.

The final control element 10 includes means responsive to a variable quality of a final control signal transmitted to it over the path 15 for correspondingly varying the average opposition or impedance which that element presents to the flow of the manipulated medium. Thus, the final control element adjusts the rate of transfer to the load 12 according to the magnitude of the variable quality of the final control signal appearing at 15.

To produce such a final control signal, a transducer 16 includes means responsive to a variable input signal appearing at 17 for producing the aforesaid variations in the quality of the final control signal according to the magnitude of the input signal. Assuming for the moment that the illustrated inhibitors 18 and 19, and an integrator 21 are inactive and serve merely to transfer to their outputs the signals applied to their inputs, the input signal at 17 is the same as a first control signal appearing at 22 and representing by its magnitude a desired average rate at which the manipulated medium is to be transferred through the final control element 10.

While the invention is applicable to open loop as well as closed loop systems, the arrangement shown in FIG. 1 is of the latter type. The first control signal at 22 is created by the output of an algebraic summing device 24 receiving as its inputs (a) a signal from a condition sensor 25 and which represents the actual value of the controlled condition, and (b) a signal from an adjustable set point device 26 and which represents the desired value of the controlled condition. Because the signals from the sensor 25 and the set point device 26 oppose one another, i.e., have opposite polarities, the output of the algebraic summing device 24 is a first control signal at 22 which in magnitude varies according to the "error" between the actual and desired values of the controlled condition.

The transducer 16 is an active (as opposed to passive) transducer and requires connection or excitation from an operating energy supply 23. Such connection is made through an operating energy on-off device S when the system is started up, and this latter device may be ganged to or interlocked with the main on-off device S' as indicated by the dashed line connection. The purpose and the operation of a time delay 85, the inhibitors 18 and 19, the integrator 21, a rate limiter 20 and a rate sensor 95 will be made clear as the description proceeds.

It will be understood from the foregoing generalized description that the system of FIG. 1 may take many specific forms. The source 11 or the supply 23 may, for example, be sources of pressurized liquid, pressurized gas, or a voltage source capable of supplying electric current. The utilization device 12 may be a hydraulically, pneumatically or electrically controlled valve, pump, motor or heater which varies a pressure, speed, position or temperature as the condition to be controlled according to the value of the manipulated medium which it receives. Depending upon the particular system involved, the final control signal at 15, and the first control signal at 22, may be varying electric, pneumatic, or hydraulic signals; and indeed if specifically chosen to be electric signals they may take the form of either a variable magnitude D.C. voltage or current, or an A.C. voltage or current which varies in amplitude, frequency or phase. From the foregoing examples, it will be understood that the system of the present invention may be practiced in a variety of specific embodiments, and that the particular ones illustrated and to be described with reference to FIGS. 2–5 are merely exemplary in nature.

Figure 2:
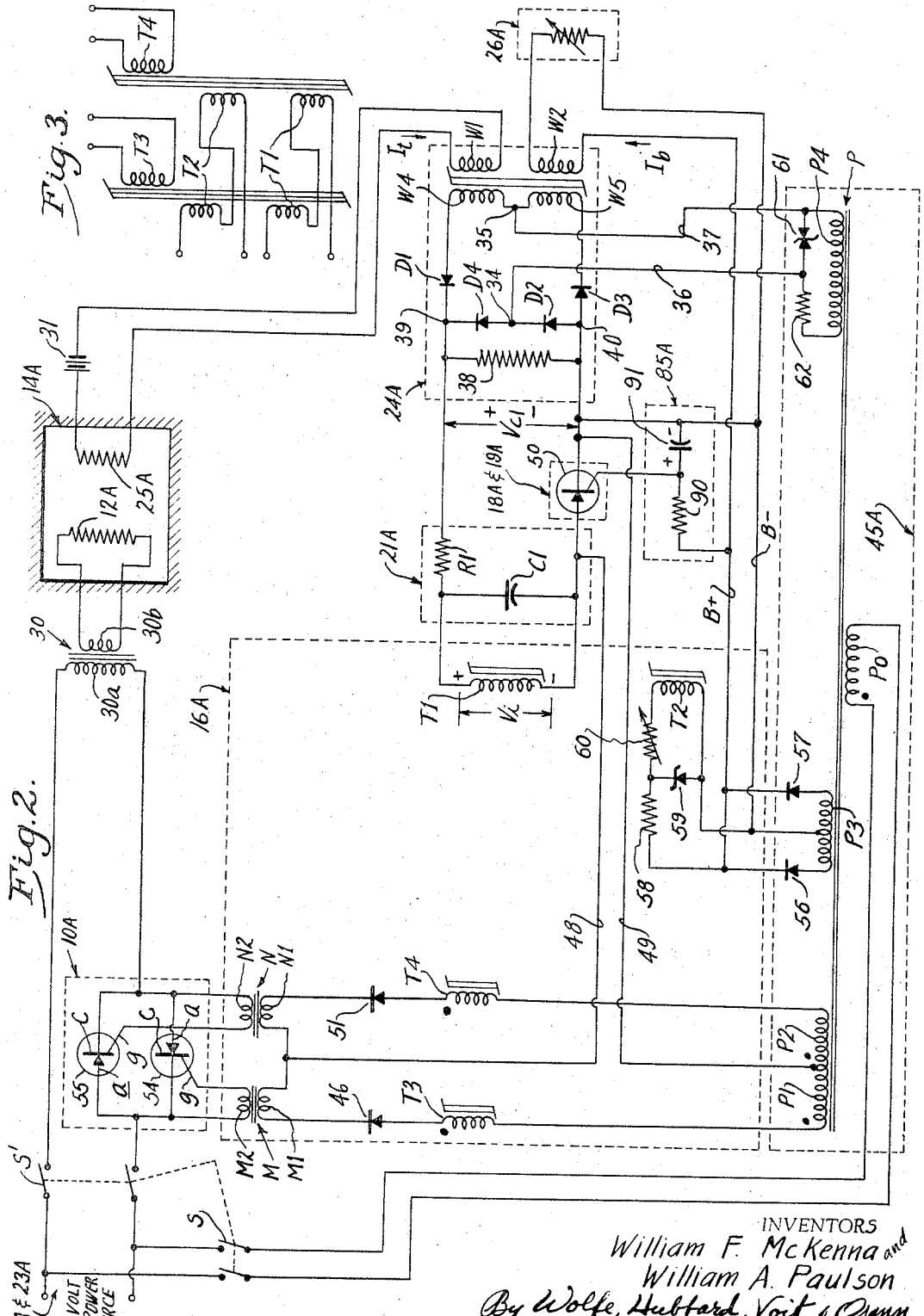
FIG. 2 is a schematic circuit diagram of an exemplary control system corresponding in part to that more generally illustrated in FIG. 1 and showing particularly an exemplary embodiment of the invention for preventing instantaneous overloads during start-up of the system.
Figure 3:
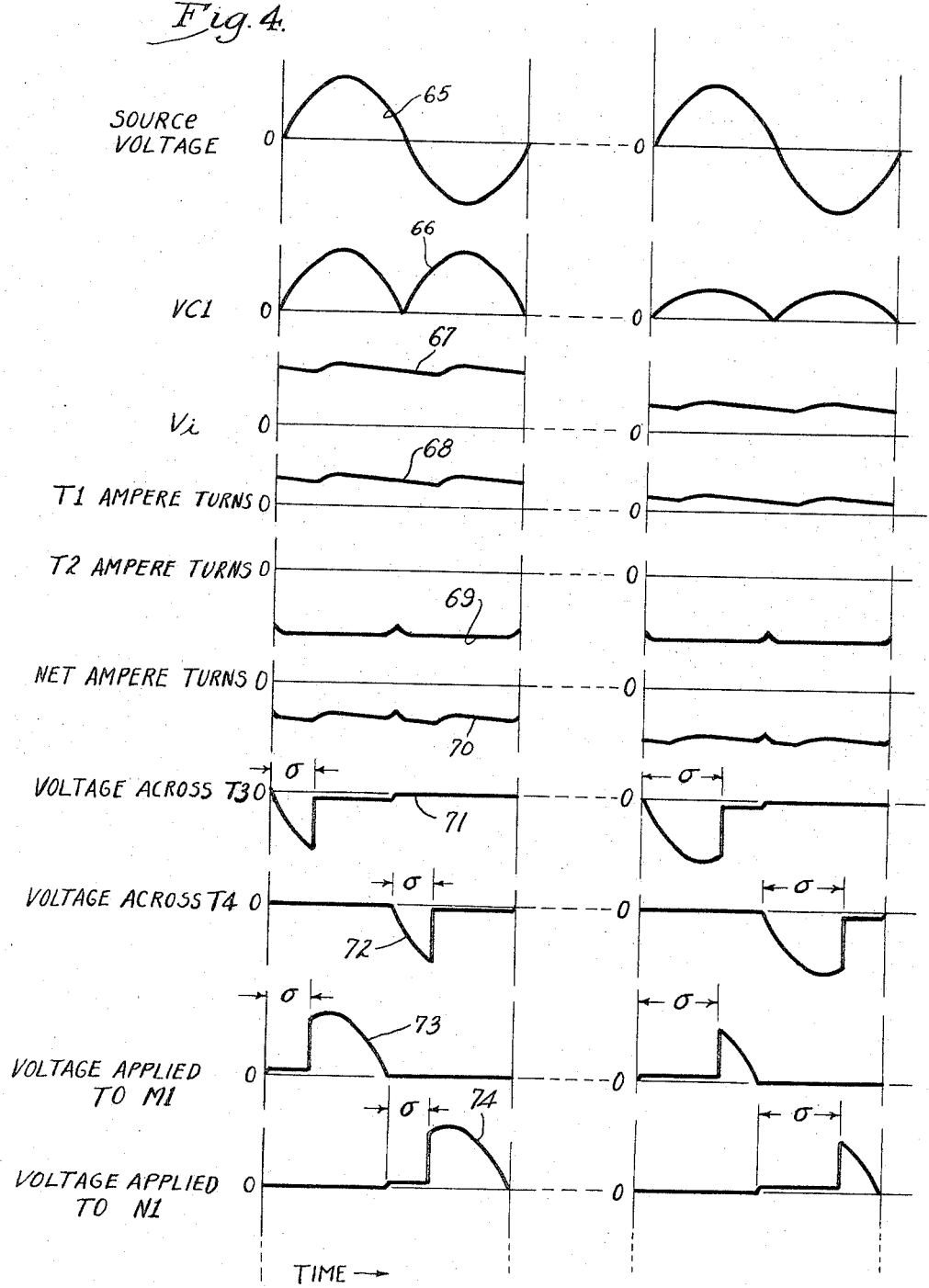
FIG. 3 is a schematic diagram of an active magnetic core transducer employed to derive a phase-variable control signal.

Referring to FIG. 2, the source of the manipulated medium is there shown as an A.C. voltage and current source 11A connected by closure of a main on-off switch S' current through a full-wave controlled rectifier 10A as a final control element and through a load device in a form of a resistance heating element 12A. As may be desired in many applications, the output of the controlled rectifier 10A is coupled to the heater 12A through a voltage step-down transformer 30 having primary and secondary windings 30a, 30b and serving to decrease the voltage but increase the current flow through the heater. The controlled condition in this instance is the temperature within a furnace 14A, such temperature being variable according to the rate at which heat is dissipated by the resistance heater 12A as a result of current flow through the latter.

As the final control element or full-wave controlled rectifier 10A "fires" or becomes conductive at smaller or larger phase angles on the successive half cycles of the A.C. source voltage, the duration of successive current pulses through the resistance heater 12A increases or decreases. The root mean square value of such heating current thus increases or decreases and the temperature within the furnace correspondingly increases or decreases.

To sense and signal the actual value of the controlled temperature, a temperature sensitive resistor 25A is disposed within the furnace and connected in a series circuit which includes a constant voltage source, here shown as a battery 31, and an input winding W1 for a magnetic amplifier 24A employed as an algebraic summing device. As the furnace temperature increases or decreases, the current $I_t$ flowing through this input winding W1 correspondingly decreases or increases.

In the present instance, the magnetic amplifier 24A is of the self-saturating bridge type familiar to those skilled in the art. It includes a bias winding W2 connected in series with a D.C. voltage source (between lines B+ and B—, as hereinafter explained) and a set point rheostat 26A. When resistance value of the latter is increased or decreased to represent an increase or a decrease in the desired set point temperature, the bias current $I_b$ flowing through the winding W2 is decreased or increased. The two magnetomotive forces created in the core of the magnetic amplifier by the currents $I_t$ and $I_b$ flowing through the respective windings W1 and W2 oppose one another, and their net effect determines the initial level of core flux in the absence of magnetomotive forces produced by the output windings. Such output windings W4 and W5 are connected in two adjoining arms of a full-wave rectifier bridge formed by four unidirectionally conductive diodes D1, D2, D3, and D4. The two input terminals 34 and 35 of this bridge are excited with an alternating current received from an A.C. voltage source across lines 36, 37. A load resistor 38 is connected across the bridge output terminals 39 and 40 so that a D.C. voltage $V_{c1}$ of the indicated polarity appears thereacross as the first control signal.

To describe briefly the operation of the summing magnetic amplifier 24A, it may be noted that on those half cycles of alternating excitation voltage making line 37 positive relative to line 36, current flows through output winding W4, diode D1, load resistor 38, and diode D2; on those half cycles of the excitation voltage making line 36 positive relative to line 37, current flows from line 36 through diode D4, load resistor 38, diode D3 and output winding W5 to line 37. Thus, the voltage $V_{c1}$ appearing across resistor 38 is a pulsating direct voltage having an average value which is determined by the value of the core flux at the beginning of each half wave of the excitation voltage. Such initial flux value is normally determined by the algebraic sum of the two opposing magnetomotive forces created by the currents $I_t$ and $I_b$ in the windings W1 and W2. For example, if the set point rheostat 26A is reduced in its effective value to decrease the set point temperature and thus to increase the bias current $I_b$, while the temperature-representing current $I_t$ remains constant, the average value of the output voltage $V_{c1}$ decreases. Conversely, if the furnace temperature drops to increase the value of the current $I_t$, while the current $I_b$ remains constant, then the output voltage $V_{c1}$ correspondingly increases. Thus, the voltage signal $V_{c1}$ has a normal or "zero error" value from which it varies in average magnitude according to the sense and extent of difference between (a) the actual or sensed furnace temperature, and (b) the desired or set point temperature represented by the adjustment of the rheostat 26A.

The voltage $V_{c1}$ may be considered as a first control signal or voltage. By its average magnitude it represents a desired average rate of current flow through the full-wave rectifier 10A, calling for a greater current to be passed when the furnace temperature is further below the set point value.

In order to convert the first control signal $V_{c1}$ into a second or final control signal of an amplified and/or different nature, the transducer 16 (FIG. 1) is employed. The transducer 16A as shown in FIG. 2 is an "active" magnetic core transducer which requires operating energy from a suitable source. As indicated in FIG. 1, an operating energy supply 23 is connected to the transducer 16 when an on-off device S is closed. In the specific example of FIG. 2, the energy supply 23A is the same as the A.C. power source 11A and the closure of the on-off switch S connects operating energy to the transducer 16A through a transformer unit 45A. It will be understood, of course, that the switches S and S' may be ganged for simultaneous operation. And in other specific embodiments, the two sources 11A and 23A may be separate and different in nature.

In the arrangement of FIG. 2, it is desired to make the control signal for the controlled rectifier 10A one whose variation in quality is a variation in the phase angle of voltage pulses produced during successive half-waves of the A.C. voltage source. The transducer in response to an input signal applied to an input element thereof supplies a final control signal to the final control element 10 in the form of pulses whose phase angles on successive half cycles of the source voltage are inversely related to the magnitude of the input signal. As illustrated in FIG. 2, the input element of the transducer 16A is a winding T1 of a saturable reactor T having a high permeability magnetic core material operated under natural magnetization conditions, as described at chapter 4 in the text "Magnetic Amplifier Circuits" by William A. Geyger (McGraw-Hill Book Company, Inc., 1954). This reactor T is separately illustrated in FIG. 3 as having four windings T1, T2, T3, T4 associated with two cores of rectangular hysteresis loop material. Those four magnetically coupled windings are shown for convenience at spaced locations in the circuit diagram of FIG. 2.

The "output" windings T3 and T4 of the reactor T are connected in the respective halves of a push-pull circuit energized from the transformer unit 45A. More particularly, this unit includes a transformer P having a primary winding P0 connected to be energized from the source 23A when the switch S is closed. As shown, a center tapped secondary winding P1, P2 for the transformer P is associated with the reactor output windings T3 and T4. The output winding T3 is connected in series with the secondary winding P1 through a diode 46 and the primary winding M1 of a transformer M. The series circuit is completed through conductors 48 and 49 which, for the moment, may be assumed to be conductively connected through a switching device 50. Similarly, the output winding T4 is connected in series with the secondary winding P2 through a diode 51 and the primary winding N1 of a transformer N, and the series circuit is completed through the same conductors 48 and 49.

It is a known property of the reactor T that the output windings T3 and T4 present a high impedance during each cycle of an A.C. voltage wave applied thereto until, at a certain phase angle, their impedance drops to a negligible value. The action has been compared in the literature to that of thyratrons which become conductive at a phase angle determined by the signal applied to their grids. The phase angle at which the output windings T3 and T4 become highly conductive varies with the flux density in the associated magnetic core at the beginning of the half-wave voltage applied to those output windings. This initial flux density is determined by the difference between the currents through (and thus the D.C. input voltage across) the input winding T1 and a bias winding T2. For a given value of bias current flowing through the winding T2, the phase angle at which the change in impedance of the output winding T3 or T4 occurs becomes smaller as the input current through the winding T1 is increased.

By virtue of the diodes 46 and 51, the output winding T3 and the transformer M can be effective only on alternate half cycles of the A.C. source voltage, while the output winding T4 and the transformer N are effective during the opposite, alternate half cycles of that A.C. voltage induced in the center tapped secondary windings P1, P2. Thus, on one half cycle of such A.C. voltage, the primary winding M1 receives an abruptly increasing input voltage only at a certain phase angle determined by the input current to the winding T1, and on the next half cycle the primary winding N1 receives an abruptly increasing input voltage at the same phase angle.

The secondary windings M2 and N2 of the transformers M and N are connected between the cathodes and gates of respective silicon controlled rectifiers (here termed SCR's) 54 and 55, the latter being connected in inverse parallel relationship, and the parallel combination being connected in series between the source 11A and the transformer 30 to constitute the controlled rectifier 10A. Thus, on opposite half cycles of the A.C. source voltage, the SCR's 54 and 55 respectively "fire" at phase angles which are inversely proportional to the input signal applied to the input element, i.e., to the voltage $V_1$ applied to the input winding T1 of the transducer 16A. The "conduction angle" or the duration of that portion of a half wave during which the SCR's conduct is thus proportional to the input signal $V_i$.

In summary, the transducer 16A has an input element T1 together with ouput circuit means for applying to the controlled rectifier 10A a final control signal which makes the latter operate with corresponding conduction angles. As the two SCR's 54 and 55 "fire" with larger or smaller conduction angles, the current pulses supplied through the primary winding 30a, and the corresponding current pulses through the heater 12A, are increased or decreased in duration, and the root mean square of the current passed through the heater 12A is thus increased or decreased.

The transducer 16A includes as an excitation element the bias winding T2 described above. The bias winding is excited when the switch S is closed by energy taken from the A.C. source 23A. For this purpose, the transformer P in the unit 45A includes a center tapped secondary winding P3 associated with rectifiers 56, 57 so as to produce between the lines B+ and B— a pulsating direct voltage. This voltage is applied across a resistor 58 and a Zener diode 59 connected in series, and a rheostat 60 in series with the winding T2 is connected across the Zener diode. In this way, the winding T2 is excited with a clipped D.C. voltage and biasing current of constant amplitude, although adjustable by changing the setting of the rheostat 60.

It may be noted that the D.C. voltage so produced on the lines B+ and B— forms the supply voltage for the series circuit of winding W2, previously described. Also, the A.C. excitation voltage for the magnetic amplifier 24A may be produced on the lines 36, 37 by a secondary winding P4 for the transformer P, this winding having the series combination of a double anode Zener diode 61 and a resistor 62 connected thereacross to clip and maintain constant the amplitude of the A.C. excitation voltage.

In keeping with the present invention, means are provided for coupling the first control signal, i.e., the voltage $V_{c1}$, to the input element T1. Assuming for the moment that the device 50 is conductive (and thus may be viewed as a closed switch), the voltage $V_{c1}$ is applied to the input terminals of an integrator 21A comprised of a resistor R1 and a capacitor C1. Thus, the input voltage $V_i$ across input winding T1 normally is proportional, and indeed substantially equal, to the voltage $V_{c1}$, inasmuch as the output terminals of the integrator are connected to that input winding, i.e., the capacitor C1 is in parallel with winding T1. One effect of the integrator is that it filters or smoothes the pulsating voltage $V_{c1}$, but other and more important functions will be discussed below.

Figure 4:
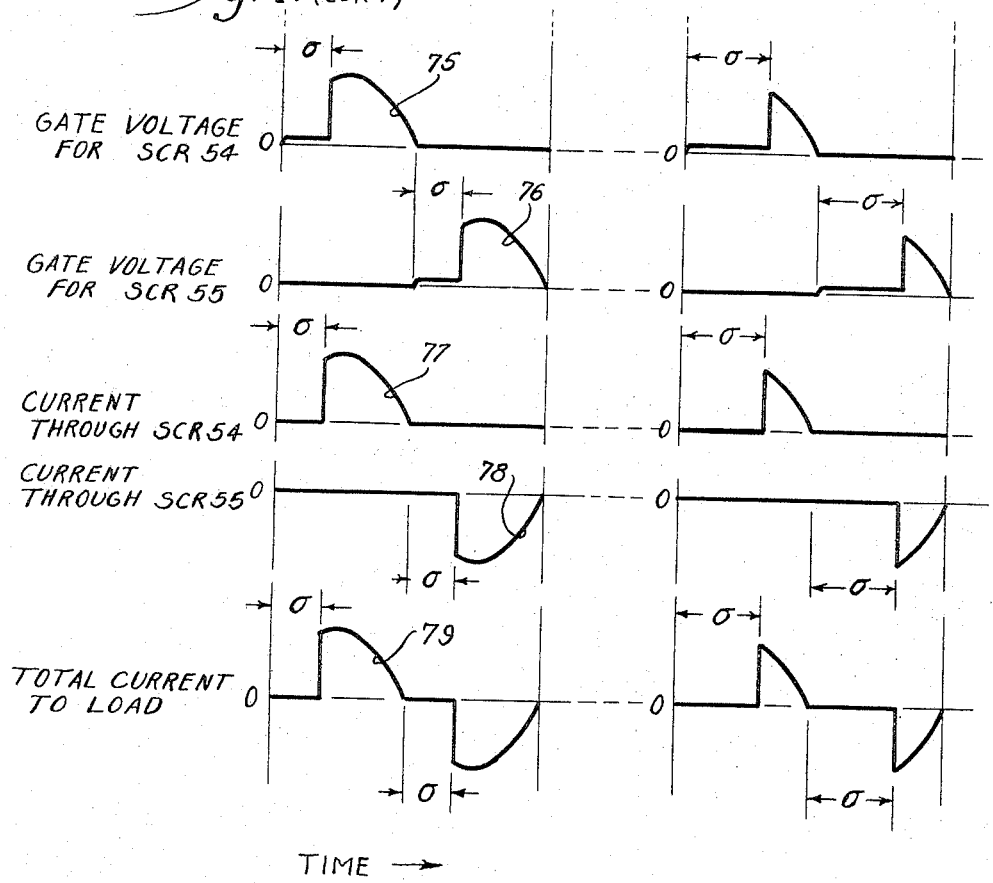
FIG. 4 is a series of graphic, idealized waveforms illustrating variation of different voltages and currents with time.

It will be helpful at this point to review the operation of the apparatus shown by FIG. 2 with reference to the various generalized waveforms graphically illustrated in FIG. 4 as plotted against a common time base. Curve 65 represents the sinusoidal variation of the A.C. voltage of the sources 11A and 23A, and this curve may also be considered as representing the voltage at the left extremity of winding P1 relative to the center tap. The voltage at the right extremity of winding P2, relative to the center tap, is similar in form to curve 65 but is 180° out of phase, as will be apparent. Curve 65 also represents generally the excitation voltage appearing between lines 36 and 37.

As noted previously, the voltage $V_{c1}$ produced by the magnetic amplifier 24A is a pulsating direct voltage produced by full-wave rectification, and this is represented by curve 66. The amplitude of the successive pulses varies according to the "error" between the furnace temperature and the set point, as above explained. It may be noted that curve 66 (and the others to be described below) has been divided into left and right portions separated by time discontinuity, the amplitude of the pulsating voltage in the left portion of curve 66 being greater than the amplitude in the right portion. This is intended to depict two different conditions in which the furnace temperature is below the set point by a relatively large or small error, respectively.

Curve 67 depicts the corresponding input voltage $V_i$ across the input winding T1, this being a substantially constant D.C. voltage as a result of the filtering and smoothing action of the integrator which is formed by the resistor R1 and the capacitor C1.

The resulting ampere-turns of M.M.F. produced by current flow through the winding T1 are represented by curve 68; while the constant (but adjustable) ampere-turns in the opposite sense produced by excitation of the bias winding T2 in the reactor T are shown by curve 69.

The net ampere-turns produced in the reactor, and thus the flux level at the beginning of the half-wave voltages applied to windings T3 and T4, are represented by curve 70. The magnitude of this variable determines the phase angle at which the impedance of the output windings T3 and T4 drops substantially to zero. The magnitude of the net ampere-turns indicated by curve 70 is determined, of course, by the difference between the ampere-turns illustrated in curves 68 and 69. If the magnitude of curve 68 increases, the magnitude of curve 70 decreases; while if the magnitude of curve 69 decreases, the magnitude of curve 70 correspondingly increases.

The voltage appearing across output windings T3 and T4 is illustrated by curves 71 and 72. These output windings each become fully conductive, and the voltage drop thereacross falls substantially to zero, at a certain phase angle $\sigma$ during respectively opposite half cycles of the curve 65.

When the voltages across windings T3 and T4 fall substantially to zero during their respective half cycles of operation, then the voltages supplied to the primary windings M1 and N1 respectively rise, as indicated by curves 73 and 74. Accordingly, the voltages induced in the secondary windings M2 and N2 and applied to the gates of SCR's 54 and 55 take the form illustrated respectively by curves 75 and 76. When these latter voltages increase abruptly at the phase angle $\sigma$, the critical firing potential for the gates of the SCR's 54 and 55 (at the then existing anode-cathode voltage) are exceeded, and the respective SCR's are rendered conductive. This is represented by curves 77 and 78 depicting the current flow through SCR 54 and SCR 55, respectively.

Because the SCR's 54 and 55 are oppositely poled and conduct during a portion of alternate half cycles of the source voltage, the total current through the primary winding 30a of the transformer 30, and thus the current through the heater element 12A, takes the form illustrated by curve 79.

From a comparison of the right and left portions of curves 65 and 79, it will be apparent that the SCR's 54 and 55 are rendered conductive at a phase angle $\sigma$ which depends upon the magnitude of the input voltage $V_i$ applied to input winding T1. As that input voltage increases or decreases, the angle $\sigma$ decreases or increases, and the root mean square value of the current transferred to the heater 12A is increased or decreased. In this way, the rate of energy transfer, i.e., effective value of the current passed through the controlled rectifier 10A from the source 11A to the load 12A is automatically increased or decreased to raise or lower the temperature of the furnace 14A according to the departure of the first control signal $V_{c1}$ from an equilibrium or zero error value. This corrective action occurs until the first control signal $V_{c1}$ reaches a value indicating that the furnace temperature is in agreement with the desired set point value, and the SCR's 54, 55 are transmitting just enough current to the load 12A to make up for normal heat losses from the furnace.

It will be helpful at this point to consider briefly the characteristics of the silicon controlled rectifiers 54 and 55 which are employed in the full-wave controlled rectifier 10A. These characteristics are implicit in the waveform curves described above, but they will be briefly repeated here. These silicon controlled rectifiers, like the thyratrons and other similar controlled rectifiers, will conduct current from their anodes $a$ to their cathodes $c$ (i.e., in the directions of the symbolic arrows in FIG. 2) only when the anode is positive with respect to the cathode. This means that the devices 54 and 55, if they conduct at all, will only conduct current during the alternate half cycles of the A.C. source voltage. Moreover, these rectifiers 54 and 55 will not conduct current in a forward direction unless and until they are "fired" by the application of a positive triggering voltage between the gate electrodes g and the cathodes c. It is important to remember, however, that such rectifiers when once "fired" present an almost negligible resistance or impedance to the flow of current, and they will continue, irrespective of gate potential, to be fully conductive until the anode-cathode potential falls substantially to zero or reverses. Thus, after either of the rectifiers 54, 55 is fired, it will conduct current during the remaining portion of that particular half-wave of the A.C. source voltage, and the instantaneous value of the current which flows through the fired rectifier will be equal approximately to the ratio of the instantaneous value of the source voltage and the instantaneous impedance presented by the primary winding 30a. The latter impedance, of course, depends upon the impedance of the heater element 12A in the transformer's secondary circuit, and reflection of such secondary impedance into the primary circuit. Thus, while the firing of the SCR's 54 and 55 at different phase angles varies the average opposititon to the flow of current to the load, the actual value of current flow depends upon average impedance presented by the primary winding 30a and thus upon the resistance of the heater 12A.

It is often desirable, as in the example of FIG. 2, to couple the final control element 10A to the load 12A through a magnetic core transformer. In many applications, very high currents at relatively low voltages are required for efficient and effective energization of the load device, and this result is achieved in the present instance by the step-down transformer 30. When a transformer is employed, however, there is a possibility that the core material thereof will retain substantial residual flux when the system is shut down. When the main switch S' is closed, therefore, to start the system, and the SCR 54 or the SCR 55 immediately conducts with a relatively small firing angle, the peak amplitude of the source voltage during the remainder of that half-wave will be applied to the transformer primary winding. In consequence, the current flow into that primary winding may be in a direction and of sufficient magnitude as to drive the transformer core into a state of saturation. And as such saturation occurs, the effective impedance of the primary winding drops almost to zero during a portion of the first half cycle of the source voltage after closure of the switch S'. In other words, the load (here represented by the transformer 30 and resistance 12A together) is such that it may present an unduly low impedance for a transient interval immediately following its energization. Thus, the current flow through the conducting SCR 54 and 55 will be unlimited by any substantial impedance and will approach for a short time an extremely great, short circuit value. Such extremely high current, even for a short period of less than one-half cycle, can damage or totally destroy the silicon controlled rectifiers 54 and 55.

Another problem exists in the present control system employing, as it does, an active transducer which requires operating energy and excitation. Although the same problem exists in the case of other types of transducers, the one here described as utilizing the saturable reactor T, may, when the system is turned off, retain substantially saturating residual flux in its core. This is especially likely since the core material has a rectangular hysteresis characteristic with high retentivity. When the switches S and S' are closed to start up the system, the core of the reactor T may be substantially saturated in a direction which results in conduction of the output winding T3 or T4 at a very small phase angle. Stated another way, the transducer 16A initially has no control and due to its residual flux it may cause the SCR's 54 and 55 to fire at less than 90° phase angles during the first few half cycles of the A.C. source voltage. Thus, if the core of reactor T is substantially saturated at the instant the switch S is closed to supply operating energy to the transducer 16A, output windings T3 and T4 present very low impedances even though at that instant the signals applied to winding T1 and T2 create substantially equal and opposite magnetizing forces. It requires several cycles of the A.C. source voltage to remove the residual magnetism in the core of the reactor T and thus to make the output windings T3 and T4 present high impedances until a controlled phase angle is reached on respective half waves of the source voltage.

From the foregoing, it will be apparent that extremely high and damaging overload currents might flow through the final control element 10A during the first few half cycles of the source voltage which immediately follow the closure of the switches S and S'. For if the reactor T is not yet in control due to residual flux therein so that firing angles are 90° or less, and either if the transformer 30 is substantially saturated or if the heater 12A is cold and presents a very low impedance, then the SCR's 54, 55 "look into" what may appear as substantially a short circuit, and destructive current may flow. In accordance with the present invention, however, the final control element 10A and the SCR's 54 and 55 therein are protected by means which preclude such excessive current even though reactor T contains residual flux and initially has no control, and even though the effective input impedance of the load transformer is initially very low.

For this purpose, means including a bi-state switching device are utilized to couple the final control signal from the transducer 16 to the final control element 10, such switching device being illustrated generally in FIG. 1 as an inhibitor 18. When the switches S and S' are closed, the inhibitor 18 and the switching device forming a part thereof are non-conductive, and so the final control signal cannot reach the final control element and the latter permits no transfer of the manipulated medium to the load. After the operating supply 23A has been connected to the transducer 16A for a predetermined period of time following the closure of the switch S, and so that the transducer 16 has become fully effective, then a time delay device 85 supplies a signal to the inhibitor 18 to render the latter conductive and to permit the final control signal to pass from the transducer 16 to the final control element 10.

Referring to the specific embodiment illustrated in FIG. 2, the inhibitor 18A is constituted by a normally non-conductive switching device in the form of a silicon controlled rectifier 50. The anode and cathode of this controlled rectifier are connected respectively to the conductors 48 and 49. When the rectifier 50 is in its first or nonconductive state, no current can flow from the secondary windings P1 or P2 to the primary windings M1 or N1, regardless of the phase angle at which the output windings T3 and T4 would otherwise tend to become conductive. Thus, upon closure of the main switch S, and during the time when the core of the reactor T may contain residual flux (so that the reactor T would tend to fire the main controlled rectifier 10A at small phase angles), the silicon controlled rectifier 50 is nonconductive, no gate signals at all can be passed to the main rectifiers 54 and 55, and the latter do not pass any current to the primary winding of the transformer 30.

Time delay means 85 (FIG. 1) are provided, however, to set the bi-state device or controlled rectifier 50 to its second or conductive state after a predetermined delay from the instant that the main switch S is closed, this delay being chosen to correspond in duration to at least one cycle of the A.C. source voltage. As here shown in FIG. 2 such time delay means 85A take the form of an R-C circuit comprising a resistance 90 and a capacitance 91 connected in series across the voltage source represented by the B+ and B− conductors. When the switch S is closed and the primary winding P0 energized so that a direct voltage appears between the conductors B+ and B−, the capacitor 91 exponentially charges with the indicated polarity by current flow through the resistor 91. It requires a finite time interval, equal to at least one cycle of the A.C. source voltage, and preferably on the order of 200 milliseconds and thus equal to approximately twelve cycles of a 60 c.p.s. source voltage, for the capacitor to charge up to a voltage which is sufficient to "fire" the rectifier 50. As shown, the positive and negative terminals of the capacitor 91 are connected to the gate and the cathode respectively of the rectifier 50 and thus the latter is rendered conductive after a predetermined delay from the instant that the main switch S is closed.

By these provisions, the final control signal in the form of variable phase pulses is prevented from reaching the gates of the main controlled rectifiers 54 and 55 for a short period subsequent to the closure of the switch S and until residual flux in the core of reactor T is removed, so that transducer 16A is effective to fire the rectifiers 54, 55 at phase angles which are determined by the input signal $V_i$ applied to the input winding T1. In this way the excessive and destructive momentary currents which might otherwise flow through the main controlled rectifiers 54 and 55 are avoided and the transducer 16A has full control over the firing angle of these rectifiers before they begin to conduct any current at all.

When the switching device or controlled rectifier 50 does become effective after expiration of the above-described time delay interval, the first control signal or voltage $V_{c1}$ may at this instant be relatively great in magnitude, especially if the temperature of the furnace is substantially below the set point value. This latter condition will usually exist when the furnace is being started in a cold condition. If the full value of the first control voltage $V_{c1}$ were then existing across the input winding T1, the latter would cause the reactor T to fire the main rectifiers 54 and 55 at relatively small phase angles, i.e., with large conduction angles. If this condition were permitted to occur, firing of the controlled rectifiers 54 or 55 at phase angles of approximately 90° or less would result in application of the full amplitude of the A.C. source voltage to the primary winding of the transformer 30, and this could drive the core of the latter into such saturation that extremely high and destructive currents would flow for a few half cycles until the transformer flux were reduced below saturation values.

In accordance with the present invention, this difficulty is here avoided by the means for coupling the first control signal $V_{c1}$ to the input element or winding T1, such coupling means including a bi-state device having first and second states (i.e., normal an actuated states) together with means for preventing the effective application of the first control signal to the input element T1 when the bi-state device is in its first state. As shown in FIG. 1, the bi-state device takes the form of an inhibitor which is interposed between the first control signal appearing at 22 and the input 17 for the transducer 16. The inhibitor 19 is normally in its first or non-conductive state and prevents the transfer of the first control signal to the input element of the transducer 16. However, when switched to its second state, the inhibitor becomes fully conductive and so transfers the control signal to the input of the transducer 16. Further in keeping with the present invention, however, means are provided for causing the input signal applied to the transducer 16 to rise gradually to a steady value corresponding to the existing value of the first control signal after the bi-state inhibitor 19 is actuated, i.e., set to its second or conductive state. This means for gradually applying the input signal to the transducer 16 takes the form of the integrator 21 associated with the input element of the transducer 16 in such a way as to prevent an abrupt increase in the input signal when the inhibitor becomes conductive.

The foregoing generalized explanation may be better understood with reference to the specific arrangement illustrated in FIG. 2. As there shown, the inhibitor 19A is constructed as a bi-state device which may conveniently and economically be formed by the same silicon controlled rectifier 50 mentioned above. It will be understood that the controlled rectifier 50 is a bi-state device in the sense that it is either conductive or non-conductive; and it further forms a part of the means for coupling the first control voltage $V_{c1}$ to the input element T1 inasmuch as its anode and cathode are connected in series between the output of amplifier 24A and the input of the integrator 21A. So long as the controlled rectifier 50 is in its first or normally non-conductive state, the first control voltage $V_{c1}$ is prevented from reaching the input winding T1 and thus the input voltage $V_i$ is zero. After the time delay device 85A has applied a firing signal to the gate of the controlled rectifier 50, and the latter is rendered conductive, the first control voltage $V_{c1}$ may be applied to the input winding T1. However, the integrator 21A which prevents the full value of the control voltage $V_{c1}$ from appearing immediately across the winding T1 is constituted by the resistor R1 and the capacitor C1 (previously described). As soon as the SCR 50 becomes conductive, the capacitor C1 charges slowly by current flow through the resistor R1 to the peak value of the pulsating control voltage $V_{c1}$. Thus, the voltage $V_i$ across the input element T1 rises gradually and exponentially so that it asymptotically approaches a value substantially equal to the first control voltage $V_{c1}$ and thereafter varies with the latter. Therefore, during the interval immediately after the switching device 50 becomes conductive or is set to its second state, the transducer 16A does not permit the main controlled rectifiers 54 and 55 to fire at relatively small phase angles which might otherwise be dictated by the value of the control voltage $V_{c1}$; on the contrary, it causes these main rectifiers 54 and 55 to initially fire at very large phase angles (on the order of 170° to 180°), those phase angles gradually diminishing as the capacitor C1 charges until they reach a value corresponding to the magnitude of the control voltage $V_{c1}$.

The result of this arrangement and operation is that the controlled rectifiers 54 and 55, when initially made conductive, are caused to fire at relatively large phase angles so that the current pulses which intially flow to the primary winding of the transformer 30 must be of relatively small amplitude and short duration. This is so because the firing of the rectifiers 54 or 55 at large phase angles results in the instantaneous value of the source voltage being relatively small when the rectifiers begin conduction. Thus, even though the input impedance of the primary winding 30a may initially be very low, excessive currents do not flow. Because successive current pulses passed to the transformer 30 alternate in direction, the magnetic core of the transformer is not driven into saturation but instead is gradually brought to a state of alternating magnetic flux equilibrium. Thus, a bi-state switching device 50 initially prevents application of the control voltage $V_{c1}$ to the input element T1 while the reactor T comes to operational equilibrium, and the integrator 21A associated with that input element makes the input signal rise gradually to the value of the control voltage after the switching device becomes conductive, thereby to gradually decrease the firing angles of the SCR's 54 and 55.

In this way, the present system provides startup protection and avoids destructive current overloads immediately after the main switch S is closed. It obviates excessive current pulses which might otherwise be created due to the transformer 30 having residual flux which might create a very low initial primary impedance. This is accomplished, first, by preventing any firing of the controlled rectifier 10A until the transducer 16A has become fully excited and operative, and secondly, by causing the firing angle of the controlled rectifier then gradually to decrease from approximately 180° to a smaller value corresponding to the magnitude of the first control voltage.

Even after the first few current pulses in opposite directions through the transformer 30 have established magnetic equilibrium in its core, so that the primary impedance depends upon the reflected value of the resistance of the heater 12A, current overloads in excess of a safe or rated value for the controlled rectifier 10A (or for the heater 12A) may occur. For example, when the system is placed in operation with the furnace 14A cold, the first control signal $V_{c1}$ will be large in magnitude and will thus call for the main SCR's 54 and 55 to fire at small phase angles substantially less than 90°. If, however, the heater element 24A has a high temperature coefficient of resistance, its resistance under these conditions may be as much as fifteen times less than the normal value which it exhibits when the furnace is hot. Thus, during the initial warm-up period, the reflected impedance presented by the primary winding 30a to current flow through the rectifiers 54 and 55 will be very low, and this impedance will increase as the furnace temperature increases. Such a low initial impedance may result in current pulses through the rectifiers 54 and 55 which exceed their rated or safe values, particularly if the firing angles are less than 90° or only slightly more than 90° so that current is conducted during those instants when the AC source voltage has its maximum instantaneous values. Other conditions, such as partial short circuiting of the heater 12A, may give rise to overload currents because the peak value of a given current pulse depends not on the phase angle at which the SCR's 54 and 55 fire (unless that angle is substantially greater than 90°) but rather upon the impedance presented by the load device.

Figure 5:
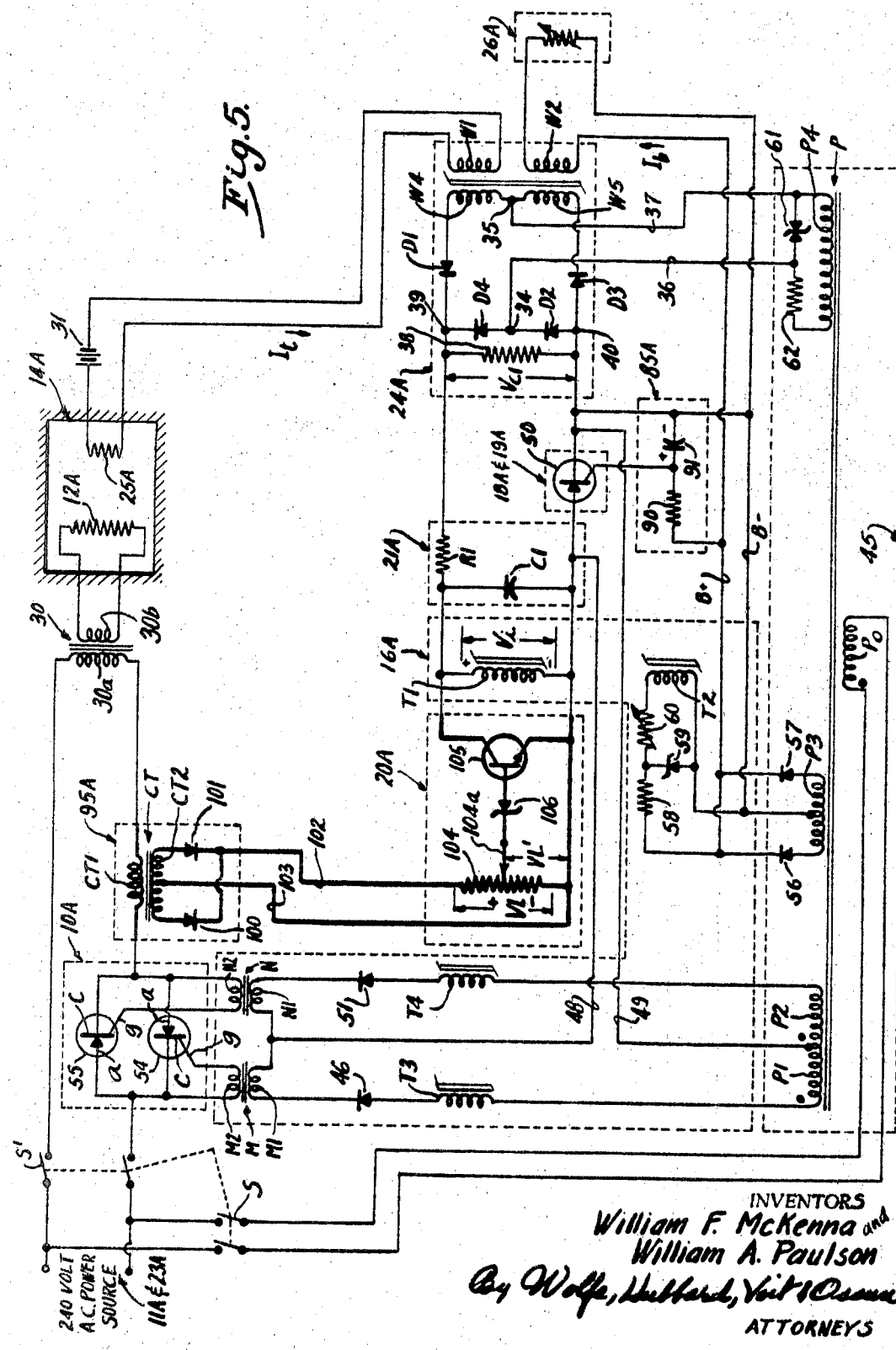
FIG. 5 is a schematic circuit diagram of a control system similar to that of FIG. 2, but further including automatic load responsive rate limiting apparatus which is also diagrammatically shown in FIG. 1.

Referring now to FIGURE 5, the embodiment of the present control system there schematically illustrated is, except for the modified portions drawn in heavy lines, identical to that shown in FIG. 2. Those portions in heavy lines cooperate with the elements already described to form an improved automatic overload limiter with fast but prolonged corrective action.

As noted above, the firing angle of the full-wave controlled rectifier 10A is varied automatically according to the magnitude of the input voltage $V_i$ applied to the input element T1, and such input voltage is normally the same as, or generally proportional to, the peak value of the control voltage $V_{c1}$ after the capacitor C1 has been charged.

In accordance with another feature of the invention, the input signal $V_i$ coupled to the transducer input element T1 is automatically and quickly shunted or bypassed around the control element to a degree determined by the amount by which the instantaneous rate of transfer of the manipulated medium (current flow in the present instance) exceeds a predetermined safe value. Such bypassing makes the input signal $V_i$ applied to the input element T1 fall below the magnitude of the first control signal $V_{c1}$ by an amount generally proportional to the detected overload, and correspondingly increases the firing angle of the rectifier 10A. But in addition, provision is made to cause the input signal $V_i$ to rise slowly and gradually back to a value equal or substantially related to the first control signal $V_{c1}$. As a result, successively recurring momentary overloads prolong the bypassing action, and it becomes a function of the peak values of the rate of transfer of the manipulated medium.

The foregoing is accomplished by providing means shown in FIG. 1 as a rate sensor 95 to sense and signal the instantaneous rate of transfer of the manipulated medium through the final control element. As shown in FIG. 5, the sensing means take the form of a current transformer CT having its primary winding CT1 connected in series with the controlled rectifier 10A, and having its center tapped secondary winding CT2 connected through rectifiers 100, 101 to two conductors 102, 103. The voltage appearing between conductors 102 and 103 is thus a pulsating direct voltage with the peak values thereof being proportional to the peak values of current passed through the rectifier 10A. A potentiometer 104 is connected between the conductors 102, 103 so that the load signal or voltage VL appears thereacross with the indicated polarity. A selected fraction of the voltage VL, here shown as a voltage VL', appears between the potentiometer wiper 104a and the conductor 103.

A rate limiter 20 (FIG. 1) responsive to the rate signal includes means for bypassing the input element T1 to a degree which corresponds to the amount by which the sensed load current exceeds a predetermined safe value. For this purpose, an NPN transistor 105 (FIG. 5) has its collector-emitter circuit connected in parallel with the input winding T1. The base of the transistor is connected through a Zener diode 106 to the wiper 104a, so that the current-representing voltage VL' is applied through the latter diode, when conductive, between the base and emitter of the transistor.

When the voltage VL' exceeds the break-down potential of the Zener diode, base-emitter current flows in the transistor 105 and with a magnitude which corresponds to the amount by which the Zener break-down voltage is exceeded. Such base-emitter current makes the collector-emitter path through the transistor conductive with an effective resistance which is in value inversely related to the amount by which the break-down potential of the Zener diode is exceeded. Thus, when the transistor 105 is rendered conductive, the first control voltage $V_{c1}$ causes current flow through the resistor R1 and the transistor 105, increasing the voltage drop across the resistor R1 and reducing the current flow through the input winding T1 below its previous value. Viewed in another sense, conduction by the transistor 105 almost instantaneously discharges the capacitor C1 until the voltage thereacross is reduced to the value of the collector-emitter voltage. Accordingly, the input voltage $V_i$ across the input winding T1 is instantaneously reduced below its original value. Such a reduction in the input voltage $V_i$ increases the phase angle at which the SCR's 54 and 55 fire, as previously explained herein. Indeed, the firing angle may be increased to a value substantially greater than 90° so that the peak values of current flowing through the SCR's 54 and 55 into a very low effective load impedance are restored to a safe or rated value.

With this arrangement, the peak or safe value of the load current which must be exceeded before the transistor 105 becomes conductive may be adjusted by changing the setting of the potentiometer wiper 104a, thereby changing the factor of proportionality between the sensed load current and the voltage VL'. Although a Zener diode 106 has been shown for preventing any conduction by the transistor 105 until the voltage VL' exceeds a certain value, the threshold conduction potential of the base-emitter path in certain types of transistors may be utilized for this purpose, and the Zener diode omitted. In order to accentuate the bypassing action when the transistor 105 is conductive, a resistor (not shown) may be connected directly in series with the winding T1 to assure that a combined resistance of the two is relatively great as compared to the "full on" collector-emitter resistance of the transistor, so that substantially all current will be diverted from the winding T1 under extreme overload conditions.

Further in carrying out the invention, an integrating means is associated with the input element T1 for causing the input signal $V_i$ to return gradually to its original value, i.e., to the value of the control signal $V_{c1}$, after the bypassing action terminates. In this instance, the same integrating means 21A described above is utilized. As noted previously, when the transistor 105 is turned on, the capacitor C1 is quickly discharged through the collector-emitter path. But when the transistor is turned off as a peak current overload disappears, the voltage across the capacitor C1 cannot rise abruptly. Rather, that voltage rises slowly and exponentially toward the peak value of the control voltage $V_{c1}$. Since the output terminals of the integrator, that is, the terminals of the capacitor C1, are connected in parallel with the input winding T1, the input voltage $V_i$ appearing across the latter therefore also rises slowly toward the peak value of the control voltage $V_{c1}$. This means that when the firing angle of the final controlled rectifiers 54 and 55 is quickly and substantially increased due to a sensed momentary current overload, that firing angle is gradually reduced back to its original value after the peak overload disappears. If another peak overload should for any reason occur before the capacitor C1 is fully recharged to its original voltage, then the action described will be repeated, and the firing angle of the final controlled rectifier will be maintained at a relatively large value. Thus, the corrective action of the current limiter here shown and described is a function of recurring peak values of current and precludes the appearance of successive substantial peak overloads which would otherwise be required to reinitiate the corrective action.

It may be noted particularly that the invention described above in the preferred embodiment of FIG. 5 utilizes the same standard and relatively inexpensive electrical components to accomplish a number of important operational functions. Thus, the bi-state switching device shown as a silicon controlled rectifier 50 and employed as an inhibitor acts in two separate circuits and thus constitutes both the inhibitor 18 and the inhibitor 19 shown in FIG. 1. A single integrator which in this instance is comprised by a resistance-capacitance circuit R1, C1 serves three distinct functions. First, it acts as a smoothing filter to convert the pulsating direct voltage $V_{c1}$ produced at the output of the magnetic amplifier 24 into substantially steady but variable-magnitude D.C. voltage appearing across the capacitor C1 and normally coupled to the input winding T1. Secondly, this integrator causes the input voltage and current for the winding T1 to rise gradually and exponentially subsequent to the switching of the controlled rectifier 50 to its conductive state, so that after the transducer 16 has been excited and is rendered effective to create a final control signal, that final control signal causes the firing angles of the final controlled rectifier to gradually decrease from a high value down to the value called for by the control voltage $V_{c1}$. Thirdly, the R1, C1 integrator performs a separate and distinct function in connection with the automatic current limiting action which occurs in response to sensed current overloads. The integrator results in the input signal $V_i$ being quickly decreased, and the firing angles of the final control element 10A increased, in response to even a momentary peak overload; yet it causes the input signal $V_i$ thereafter gradually to increase to its original value so that the firing angles of the controlled rectifier 10A gradually decrease back to their original value. It is apparent, therefore, that the current limiting operation both immediately after closure of the main switch S and in response to sensed current overloads is accomplished by a relatively few inexpensive, reliable, and simple electrical components.

We claim as our invention:

1. In a control system having a final control element responsive to a variable final control signal for regulating the transfer of a manipulated medium which influences a condition to be controlled, the combination comprising a transducer having an operating energy input and including means responsive to a variable input signal applied to an input element for supplying a correspondingly varying final control signal to said final element, on-off means for selectively connecting said energy input to a source of operating energy, means for producing a first control signal representing a desired rate of transfer of the manipulated medium, an integrator having an input adapted to receive said first control signal and an output coupled to supply an input signal to said input element, first inhibitor means for preventing transmission of said final control signal from said transducer to said final element for a predetermined time delay interval following turn-on of said on-off means, second inhibitor means for preventing transmission of said first control signal to said integrator input at least until said delay interval has ended, so that said input signal rises gradually to a value corresponding to said first control signal, means for sensing the rate of transfer of the manipulated medium, and means for bypassing said input signal from said input element to a degree corresponding to the amount by which the sensed value exceeds a predetermined value, said integrator constituting means for causing said input signal to return gradually to a value corresponding to said first control signal after the bypassing operation terminates.

2. The combination set forth in claim 1, further characterized in that said first and second inhibitor means are constituted by a single switching device coupled to be turned on by a time delay device which is set in operation in response to turn-on of said on-off means.

3. In a control system having a final control element responsive to a variable final control signal for regulating the transfer of a manipulated medium which influences a condition to be controlled, the combination comprising a transducer having an operating energy input and including means responsive to a variable input signal for applying a correspondingly varying final control signal to said final element, on-off means for selectively connecting said energy input to a source of operating energy, means for producing a first control signal representing the desired rate of transfer of the manipulated medium, an integrator having an input adapted to receive said first control signal and an output connected to supply an input signal to said transducer, first inhibitor means for preventing transmission of said final control signal from said transducer to said final element for a predetermined time delay interval following turn-on of said on-off means, and second inhibitor means for coupling said first control signal to said integrator input after said delay interval has ended, thereby to cause said input signal to rise gradually to a value corresponding to said first control signal.

4. The combination set forth in claim 3, and further characterized in that said first and second inhibitor means are constituted by a single switching device.

5. The combination set forth in claim 3, further characterized by a main switch for selectively connecting said final control element to a source of the manipulated medium, and means for causing said on-off means to disconnect said transducer energy input from said source of operating energy whenever said main switch disconnects said final control element from the source of the manipulated medium.

6. In a control system, the combination comprising a controlled rectifier adapted to have its input connected through a main switch to an A.C. voltage source and having its output adapted for connection to a load which may present a very low impedance for a transient period immediately following energization; means for producing a first control signal which by its magnitude represents the average value of current to be passed by said controlled rectifier; an active transducer having an input element, an excitation element, and an output circuit; means for energizing said excitation element from said A.C. voltage source when said main switch is closed; said transducer including means for producing a final control signal capable of firing said controlled rectifier at phase angles on the half waves of said source voltage determined by the magnitude of an input signal applied to said input element after said excitation element has been energized; but said last-named means making said final control signal capable of firing said controlled rectifier at phase angles of less than 90°, irrespective of the input signal, until said excitation element has been energized for a predetermined time period; means including a normally non-conductive switching device for (a) coupling said final control signal to said controlled rectifier and (b) coupling said first control signal to said input element; means for rendering said switching device conductive only after said main switch has been closed for a period of at least as long as said predetermined time period; and means for causing the input signal coupled to said input element to rise gradually to the value of said first control signal after said switching device is rendered conductive, whereby excessive currents through said controlled rectifier immediately after closure of said main switch are prevented.

7. In a control system, the combination comprising a full-wave controlled rectifier adapted to have its input connected through a main switch to an A.C. voltage source and having its output adapted for connection to a load through a magnetic core transformer which may retain substantial residual flux when de-energized; means for producing a first control signal which by its magnitude represents the average value of current to be passed by said controlled rectifier; an active transducer having an input element, an excitation element and an output circuit; means for energizing said excitation element from said A.C. voltage source when said main switch is closed; said transducer including means for producing a final control signal capable of firing said controlled rectifier at phase angles on the half waves of said source voltage which vary inversely according to the magnitude of the input signal applied to said input element after said excitation element has been energized; but said last-named means making said final control signal capable of firing said controlled rectifier at phase angles of less than 90°, irrespective of the first input signal, until said excitation element has been energized for a period corresponding to at least one cycle of said source voltage; means including a normally non-conductive switching device for (a) coupling said final control signal to said controlled rectifier and (b) coupling said first control signal as the input signal to said input element; time delay means for rendering said switching device conductive only after said main switch has been closed for a period at least as long as that for one cycle of said source voltage; and integrating means for making the input signal received by said input element rise gradually to the value of said first control signal after said switching device is rendered conductive, whereby excessive currents through said controlled rectifier immediately after closure of said main switch are prevented.

8. In a control system, the combination comprising a controlled rectifier adapted to have its input connected through a main switch to an A.C. voltage source and having its output adapted for connection to a load which may present an unduly low impedance during a transient period immediately following its energization; means for producing a first control signal which by its magnitude represents the average value of current to be passed by said controlled rectifier; a transducer having an input element, an excitation element, and an output circuit; said transducer having means for producing in said output circuit a second control signal capable of causing turn-on of said rectifier at phase angles on the A.C. source voltage half waves which are generally inversely related to the magnitude of an input signal applied to said input element after said excitation element has been energized, but said last-named means making said second control signal capable of firing said controlled rectifier at phase angles of less than 90° until said excitation element has been energized for a period corresponding to at least one cycle of said source voltage; means for energizing said excitation element from said A.C. voltage source when said main switch is closed; a single normally non-conductive switching device; circuit means including said single switching device for (a) coupling said second control signal to said controlled rectifier and (b) coupling said first control signal to said input element; time delay means for making said switching device conductive after a predetermined delay from the instant said main switch is closed; and means including an integrating device associated with said input element for causing the signal received by the latter to rise gradually to the value of said first control signal after said switching device becomes conductive.

9. The combination set forth in claim 8, further characterized in that said first control signal is a direct voltage, and said integrating means is a resistance-capacitance circuit having its input connected by said switching device when the latter is conductive to receive said direct voltage, and said input element is effectively connected in parallel with said capacitance to receive the gradually rising voltage across the latter after said switching device becomes conductive.

10. The combination set forth in claim 8, further characterized in that said switching device is a second controlled rectifier having its anode and cathode connected in two series circuits for (a) transmitting said second control signal from said output circuit to said first-named controlled rectifier and (b) transmitting said first control signal to said input element; and said time-delay means is a resistance-capacitance circuit connected to be energized when said main switch is closed and to supply a turn-on signal to said second controlled rectifier after a predetermined delay from the instant said main switch is closed.

11. In a control system having a final control element responsive to a variable final control signal for regulating the transfer of a manipulated medium which influences a condition to be controlled, the combination comprising a transducer having means responsive to a variable input signal for applying a correspondingly varying final control signal to said final element, on-off means for selectively connecting said final control element to a source of the manipulated medium, means for producing a first control signal representing the desired rate of transfer of the manipulated medium, an integrator having an input adapted to receive said first control signal and an output connected to supply an input signal to said transducer, and inhibitor means for preventing transmission of said first control signal to said integrator input until after turn-on of said on-off device, whereby said input signal rises gradually to a value corresponding to said first control signal.

12. In a control system, the combination comprising a full-wave controlled rectifier adapted to have its input connected to an A.C. voltage source and having its output adapted for connection to a load through a magnetic core transformer which may retain substantial residual flux when de-energized, means for producing a first control signal which by its magnitude represents the average value of current to be passed by said controlled rectifier, a transducer having an input element, said transducer including means for supplying to said controlled rectifier a second control signal which causes turn-on of the rectifier at phase angles on the A.C. source voltage half waves which are generally inversely related to the magnitude of the signal applied to said input element, means for coupling said first control signal to said input element, said coupling means including a bis-state device having first and second states, means for preventing effective application of said first control signal to said input element when said device is in its first state, and means responsive to the setting of said device to its second state for causing said input element to receive a signal which gradually rises to a value corresponding to that of said first control signal and thereafter varies with changes in the latter, whereby the magnitudes of the first few current pulses passed by said controlled rectifier are limited and progressively increased to preclude current overloads which otherwise might occur due to residual flux in said transformer core.

13. In a control system, the combination comprising a controlled rectifier adapted to have its input connected to an A.C. voltage source and having its output adapted for connection to a load which may present an unduly low impedance for a transient period immediately following its energization, means for producing a first control signal which by its magnitude represents the average value of current to be passed by said controlled rectifier, a transducer having an input element, said transducer including means for supplying to said controlled rectifier a second control signal which causes turn-on of the rectifier at phase angles on the A.C. source voltage half waves which are inversely related to the magnitude of the signal applied to the input element, a controllable bi-state switching device having a normal state and an actuated state, means responsive to said switching device in the normal state for preventing effective application of said first control signal to said input element, and integrating means responsive to setting of said switching device in its actuated state for applying to said input element a signal which rises gradually to the value of said first control signal and thereafter varies with the latter.

14. In a control system, the combination comprising a controlled rectifier adapted to have its input connected to an A.C. voltage source and having its output adapted for connection to a load which may present an unduly low impedance for a transient period immediately following its energization, means for producing a first control signal which by its magnitude represesnts the average value of current to be passed by said controlled rectifier, a transducer having an input element, said transducer including means for supplying to said controlled rectifier a second control signal which causes turn-on of the rectifier at phase angles on the A.C. source voltage half waves which are generally inversely related to the magnitude of the signal applied to said input element, means for coupling said first control signal to said input element, said coupling means including a bi-state switching device having first and second states, means for preventing effective application of said first control signal to said input element when said bi-state device is in its first state, means including an integrator energized in response to setting of said device to its second state for gradually applying to said input element a signal which asymptotically approaches the value of said first control signal, whereby the firing angle of said controlled rectifier is gradually decreased from about 180° at the instant said device is set in its second state to a lesser value which corresponds to the value of said first control signal.

15. In a control system, the combination comprising a full-wave controlled rectifier adapted to have its input connected to an A.C. voltage source and having its output adapted for connection to a load through a magnetic core transformer which may retain substantial residual flux when de-energized, means for producing a first control signal which by its magnitude represents the average value of current to be passed by said controlled rectifier, a transducer having an input element, said transducer including means for supplying to said controlled rectifier a second control signal which causes turn-on of the rectifier at phase angles on the A.C. source voltage half waves which are generally inversely related to the magnitude of the signal applied to said input element, means for coupling said first control signal to said input element, said coupling means including a bi-state device having first and second states, means for preventing effective application of said first control signal to said input element when said device is in its first state, a resistance-capacitance circuit and means for connecting it across a direct voltage source in response to setting of said device to its second state, and means associating said capacitance with said input element to make the signal received by the latter gradually rise to a value corresponding to that of said first control signal and thereafter vary with changes in the latter signal as the capacitance charges to the voltage of said direct source, whereby the magnitudes of the first few current pulses passed by said controlled rectifier are limited and progressively increased to preclude current overloads which otherwise might occur due to initial residual flux in said transformer core.

16. In a control system, the combination comprising a controlled rectifier adapted to have its input connected to an A.C. voltage source and having its output adapted for connection to a load which may present an unduly low impedance during a transient period immediately following its energization, means for producing a first control signal which by its magnitude represents the average value of current to be passed by said controlled rectifier, a transducer having an input element, said transducer including means for supplying to said controlled rectifier a second control signal in the form of phase-variable pulses which cause turn-on of the rectifier at phase angles on the A.C. source voltage half waves which are generally inversely related to the magnitude of the signal applied to said input element, means for coupling said first control signal to said element, said coupling means including a bi-state switching device having first and second states, means for preventing effective application of said first control signal to said input element when said bi-state switching device is in its first state so that the said phase-variable pulses have a phase angle of about 180°, an integrator including a resistance-capacitance circuit charged from a direct voltage source in response to setting of said device to its second state, and means responsive to the gradually increasing charge on said capacitance which asymptotically approaches said direct voltage for gradually applying to said input element a signal which asymptotically approaches the value of said first control signal, whereby the firing angle of said controlled rectifier is gradually decreased from about 180° at the instant said device is set in its second state to a lesser value which corresponds to the value of said first control signal.

17. In a control system, the combination comprising a full-wave controlled rectifier adapted to have its input connected to an A.C. voltage source and having its output adapted for connection to a load through a magnetic core transformer which may retain substantial residual flux when de-energized, means for producing a first control signal which by its magnitude represents the average value of current to be passed by said controlled rectifier, a transducer having an input element, said transducer including means for supplying to said controlled rectifier a second control signal which causes turn-on of the rectifier at phase angles on the A.C. source voltage half waves which are generally inversely related to the magnitude of the signal applied to the input element, an integrator having means for producing an output signal which varies generally as the time integral of variations in the input signal applied thereto, normally non-conductive switch means for coupling said first control signal to the input of said integrator, means coupling said input element to the output of said integrator, and means for rendering said switch means conductive, whereupon the firing angle of said controlled rectifier gradually decreases from about 180° to a value corresponding to the first control signal and current overloads due to low saturation impedance of said transformer are prevented.

18. In a control system, the combination comprising a controlled rectifier adapted to have its input connected to an A.C. voltage source and having its output adapted for connection to a load which may present an unduly low impedance during a transient interval immediately following its energization, means for producing a control voltage which by its magnitude represents the average value of current to be passed by said controlled rectifier, a transducer having an input element, said transducer including means for supplying to said controlled rectifier a control signal which causes turn-on of the rectifier at phase angles on the A.C. source voltage half waves which are inversely related to the magnitude of a voltage applied to the input element, a resistance and a capacitance connected in series circuit to form an integrator, a silicon-controlled rectifier (SCR) for coupling said control voltage to said series circuit, means coupling said input element in parallel with said capacitor, and means for rendering said SCR conductive, whereby the voltage applied to said input element gradually rises to the value of said control voltage after said SCR is rendered conductive.

19. In a control system having a final control element responsive to a variable final control signal for regulating the transfer of a manipulated medium which influences a condition to be controlled, the combination comprising an active transducer having an operating energy input and including means responsive to a variable input signal for applying a correspondingly varying final control signal to said final element, on-off means for selectively connecting said energy input to a source of operating energy, means for producing and supplying as said variable input signal a first control signal representing the desired rate of transfer of the manipulated medium, and inhibitor means for preventing transmission of said final control signal from said transducer to said final element for a predetermined time delay interval following turn-on of said on-off means.

20. In a control system, the combination comprising a controlled rectifier adapted to have its input connected through a main switch to an A.C. voltage source and having its output adapted for connection to a load which may present an unduly low impedance during a transient period immediately following its energization; an active transducer having an input element, an excitation element, and an output circuit; means for energizing said excitation element from said A.C. voltage source when said main switch is closed; said transducer including means for producing a final control signal capable of firing said controlled rectifier at phase angles of the half waves of said source voltage determined by the magnitude of a first control signal applied to said input element after said excitation element has been energized; but said last-named means making said final control signal capable of firing said controlled rectifier at phase angles of less than 90°, irrespective of the input signal, until said excitation element has been energized for a predetermined time period; means including a normally non-conductive switching device for coupling said final control signal to said controlled rectifier, and time delay means for rendering said switching device conductive only after said main switch has been closed for a period at least as long as said predetermined time period, whereby excessive currents through said controlled rectifier immediately after closure of said main switch are prevented.

21. In a control system, the combination comprising a controlled rectifier adapted to have its input connected through a main switch to an A.C. voltage source and having its output adapted for connection to a load which may present an unduly low impedance during a transient period immediately following its energization; means for producing a first control signal which by its magnitude represents the average value of current to be passed by said controlled rectifier; an active transducer having an input element, an excitation element, and an output circuit; means for coupling said first control signal to said input element; means for energizing said excitation element from said A.C. voltage source when said main switch is closed; said transducer including means for producing a final control signal capable of firing said controlled rectifier at phase angles on the half waves of said source voltage which vary inversely according to the magnitude of the first control signal applied to said input element after said excitation element has been energized; but said last-named means making said final control signal capable of firing said controlled rectifier at phase angles of less than 90°, irrespective of the first input signal, until said excitation element has been energized for a period corresponding to at least one cycle of said source voltage; means including a normally non-conductive switching device for coupling said final control signal to said controlled rectifier; and time delay means for rendering said switching device conductive only after said main switch has been closed for a period at least as long as that for one cycle of said source voltage, whereby excessive currents through said controlled rectifier immediately after closure of said main switch are prevented.

22. In a control system, the combination comprising a controlled rectifier adapted to have its input connected through a main switch to an A.C. voltage source and having its output adapted for connection to a load which may present an unduly low impedance during a transient period immediately following its energization; means for producing a first control signal which by its magnitude represents the average value of current to be passed by said controlled rectifier; an active transducer having an input element, an excitation element, and an output circuit; means for coupling said first control signal to said input element; means for energizing said excitation element from said A.C. voltage source when said main switch is closed; said transducer including means for producing a final control signal capable of firing said controlled rectifier at phase angles on the half waves of said source voltage which vary inversely according to the magnitude of the first control signal applied to said input element after said excitation element has been energized; but said last-named means making said final control signal capable of firing said controlled rectifier at phase angles of less than 90°, irrespective of the first input signal, until said excitation element has been energized for a period corresponding to at least one cycle of said source voltage; means including a normally non-conductive silicon controlled rectifier for coupling said final control signal to said controlled rectifier; a resistance-capacitance circuit and means for charging the capacitance therein from a direct voltage source when said main switch is closed; and means for coupling said silicon controlled rectifier to said capacitance so as to cause turn-on of such rectifier at an instant delayed from the closing of said main switch for a period not less than the period for one cycle of said source voltage, whereby excessive currents through said full-wave controlled rectifier immediately after closure of said main switch are prevented.

23. In a control system having a final control element responsive to a variable final control signal for regulating the transfer of a manipulated medium which influences a condition to be controlled, the combination comprising a transducer having an input element and including means responsive to a variable input signal applied thereto for supplying a correspondingly varying final control signal to said final element, means for producing a first control signal representing a desired rate of transfer of the manipulated medium, an integrator having an input adapted to receive said first control signal and an output coupled to supply an input signal to said input element, means for sensing the rate of transfer of the manipulated medium, and means for bypassing said input signal from said input element to a degree corresponding to the amount by which the sensed value exceeds a predetermined value, said integrator constituting means for causing said input signal to return gradually to a value corresponding to said first control signal after the bypassing operation terminates.

24. In a system for controlling the transfer of a medium from a source to a utilization load, the combination comprising a final control element interposed between said source and load and having means responsive to a variable quality of a final control signal for correspondingly varying the average opposition presented to the transfer of the medium, means for producing a first signal which by its magnitude represents a desired rate of transfer of said medium, a transducer having an input element and output means for supplying a final control signal to said control element which varies in quality according to the magnitude of an input signal supplied to said input element, means for coupling said first control signal to said input element, means for sensing the actual rate at which said medium is transferred to said load, means for bypassing said first control signal from said input element to a degree corresponding to the amount by which the sensed actual rate exceeds a predetermined safe value, and integrating means associated with said bypassing means for preventing the signal applied to said input element from returning immediately to the value of said first control signal after the bypassing operation terminates.

25. In a system for controlling the transfer of a medium from a source to a utilization load, the combination comprising a final control element interposed between said source and load and having means responsive to a variable quality of a final control signal for changing the opposition presented to the transfer of the medium, means for producing a first control signal which by its magnitude represents a desired average rate of transfer of said medium, a transducer having an input element and means for supplying to said final control element a final control signal which varies in said quality according to the magnitude of an input signal applied to said input element, means for coupling said first control signal to said input element, means for producing a rate signal instantaneously proportional to the rate of transfer of said medium to said load, means responsive to said rate signal for substantially instantaneously bypassing said first control signal from said input element to a degree determined by the amount by which said rate signal exceeds a predetermined value, said predetermined value corresponding to a maximum safe value for the rate of transfer of said medium, such bypassing operation reducing the input signal to said input element below the magnitude of said first control signal, and means for causing said input signal to rise gradually to the value of said first control signal after said bypassing operation terminates, whereby the rate of transfer of the medium is limited according to a function of the peak values of the actual rate of transfer.

26. In a system for controlling the flow of current from an A.C. source to an electric current load, the combination comprising a final control element interposed between said source and load, said final element having means responsive to a variable quality of a final control voltage for correspondingly changing the average opposition presented to current flow from the source to the load, means for producing a first direct control voltage which by its magnitude inversely represents the desired average opposition to such current flow, a transducer having an input element and means for supplying to said final element a final control voltage which varies in said quality according to the voltage applied to such input element, means for coupling said first control voltage to said input element, means for producing a rate voltage instantaneously proportional to the current flow to said load, means responsive to said rate voltage for bypassing said input element and reducing the voltage thereon below the value of said first control voltage by an amount substantially proportional to the amount by which said current exceeds a predetermined safe value, so that the opposition of said final element to current flow is increased, and means including a resistance-capacitance integrating circuit associated with said input element for temporarily maintaining the voltage applied to said input element below the value of said first control voltage after the operation of said bypassing means ceases.

27. In a system for controlling the flow of current from an A.C. voltage source to an electric current utilization device, the combination comprising a controlled rectifier interposed between said source and load, said controlled rectifier having means responsive to a variable quality of a final control voltage for turning on said controlled rectifier at phase angles on the A.C. source voltage wave which are related to said quality, a transducer having input terminals and means for supplying to said controlled rectifier a final control signal which varies in said quality according to the magnitude of a D.C. input voltage applied to said terminals, means for producing a first control voltage which by its magnitude inversely represents the desired firing phase angle of said controlled rectifier, means for coupling said first control voltage to said input terminals, means for producing a rate voltage instantaneously proportional to the current flowing through said controlled rectifier, means responsive to said rate voltage for variably shunting and bypassing said first control voltage around said input terminals to reduce the actual input voltage below the value of the first control voltage to a degree corresponding to the amount by which said rate voltage exceeds a predetermined limit value, and means including an R-C integrating circuit coupled to said input terminals for causing the input voltage therebetween to rise gradually to the value of said first control voltage after said shunting and bypassing means cease to operate, whereby the firing phase angle of said controlled rectifier is increased when overload current tends to flow and as a function of the peak values of the overload current.

References Cited

UNITED STATES PATENTS 3,098,919   7/1963   Paulson _____ 307—88.5
3,132,287   5/1964   Yarbrough _____ 317—11 X
3,237,030   2/1966   Coburn.

MILTON O. HIRSHFIELD, *Primary Examiner.*

R. V. LUPO, *Assistant Examiner.*